Patented Oct. 13, 1953

2,655,505

UNITED STATES PATENT OFFICE 2,655,505

BIBENZOTHIAZOLES AND METHOD FOR PRODUCING THE SAME

Norbert Steiger, Nutley, N. J., assignor to Hoffmann-La Roche Inc., Nutley, N. J., a corporation of New Jersey No Drawing. Application April 16, 1952,
Serial No. 282,680

11 Claims. (Cl. 260—306.6)

This invention relates to bibenzothiazoles and more particularly to 2,2'-bis(di-lower alkylaminoalkylmercapto)-4,4'-bis(β-di-lower alkylaminoalkoxy)-6,6'-bibenzothiazoles and the acid addition salts thereof.

The compounds in the form of the free base can be represented by the following formula:

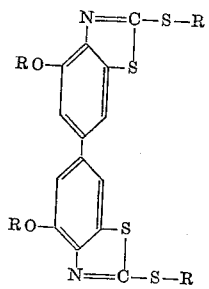

wherein R stands for di-lower alkylaminoalkyl.

The invention also embraces the method for producing the aforesaid compounds and novel intermediates employed in their production. The 2,2'-bis(di-lower alkylaminoalkylmercapto)-4,4'-bis(β-di-lower alkylaminoalkoxy)-6,6'-bibenzothiazoles are trichomonacides.

In general, the novel compounds can be prepared by reacting 2,2'-bis-(mercapto)-4,4'-bis-hydroxy)-6,6'-bibenzothiazole in the form of its alkali metal salt, as, for example, the sodium, potassium, and lithium salts with a lower dialkylaminoalkyl halide, as, for example, 1-dimethylamino-2-chloro-ethane, 1-di-ethylamino-2-chloro-ethane, 2-chloro-1-diethylamino - propane, and the like. The reaction is preferably carried out in the presence of an organic solvent or diluent, as, for example, chlorobenzene, toluene, xylene, and the like. The 2,2'-bis(di-lower alkylaminoalkylmercapto)-4,4'-bis(β - di - lower alkylaminoalkoxy)-6,6'-bibenzothiazoles can be recovered from the reaction medium as the free base by removing the organic solvent or as the acid addition salts thereof, for example, as a hydrochloride or hydrobromide, by passing hydrogen chloride or hydrogen bromide into the reaction medium. The free bases readily yield acid addition salts with strong organic and inorganic acids. Thus, by treating the bases with an equivalent amount of an acid, as, for example, hydrochloric, hydrobromic, sulfuric, phosphoric, nitric, acetic, propionic, caprylic, undecylenic, tartaric and citric acids, the corresponding acid addition salts of 2,2'-bis(di-lower alkylaminoalkylmercapto) - 4,4' - bis(β-di-lower alkylaminoalkoxy)-6,6'-bibenzothiazoles are obtained.

The 2,2'-bis(mercapto)-4,4'-bis(hydroxy)-6,6'-bibenzothiazole employed as an intermediate is, to my best knowledge, new and can be readily prepared as illustrated by the following example:

Example A 160 grams of 3,3'-dimethoxybenzidine dihydrochloride, 450 cc. of sulfur monochloride, and 150 cc. of acetic acid were heated within 1 hour to 100° C. then to 108–110° C. for 6 hours. The reaction product was filtered at 50° C., washed with benzene, and sucked dry. The formed 4,4'-dimethoxy-6,6'-bis(benzo-2,3-thiaza - 1 - thionium chloride was added with agitation to a solution made up of 600 cc. of alcohol, 550 cc. of sodium hydroxide (40%), 25 grams of sodium hydrosulfite, and 25 grams of sodium sulfide. The temperature rose to 65° C. 300 cc. of water and 10 grams of sodium hydrosulfite were added; and the reaction mixture was heated one-half hour at 70° C. Then a solution of 100 cc. of carbon disulfide in 100 cc. of alcohol was slowly added, and the reaction mass was heated for 2 hours under reflux. The alcohol and excess carbon disulfide were distilled off. To the residue was added 150 grams of sodium chloride. The sodium salt of 2,2'-bis(mercapto)-4,4'-bis(methoxy) - 6,6' - bibenzothiazole thus obtained was filtered at room temperature and washed with a 20% sodium chloride solution. The sodium salt was dissolved in hot water (90° C.), filtered, and the filtrate was acidified with hydrogen chloride, whereupon 2,2'-bis(mercapto)-4,4'-bis(methoxy)-6,6' - bibenzothiazole precipitated. It was filtered off and dried.

The 2,2' - bis(mercapto) - 4,4' - bis(methoxy) - 6,6'-bibenzothiazole was hydrolyzed to 2,2'-bis(mercapto) - 4,4' - bis(hydroxy) - 6,6' - bibenzothiazole in the following manner:

40 grams of 2,2' - bis(mercapto) - 4,4' - bis-(methoxy)-6,6'-bibenzothiazole, 400 cc. of chlorobenzene, and 70 grams of anhydrous aluminum chloride were heated together for 3 hours to 130–133° C. under reflux and stirring. The reaction mass was then cooled to 20° C. and 100 grams of ice and 100 cc. of water were added and stirred for 1 hour. The chlorobenzene was removed from the reaction mixture by steam distillation. To the residue were added 25 cc. of concentrated hydrochloric acid (specify gravity 1.19) and 500 cc. of water, and the mixture was filtered. The residue, which, after drying, was obtained as a sandy powder of slight tan color, was 2,2' - bis(mercapto) - 4,4' - bis(hydroxy) - 6,6'-bibenzothiazole.

The following examples will serve to illustrate the preparation of the 2,2'-bis(di-lower alkylaminoalkylmercapto)-4,4'-bis(β-di-lower alkylaminoalkoxy)-6,6'-bibenzothiazoles:

Example 1

18 grams of 2,2'-bis(mercapto)-4,4'-bis(hydroxy)-6,6'-bibenzothiazole, 300 cc. of chlorobenzene, 12 grams of sodium methylate, and 35 cc. of methanol were heated together with agitation to 70° C. for one-half hour then heated within 1 hour to 130–133° C. to allow the methanol to distill off completely. The reaction mass comprising 2,2'-bis(mercapto)-4,4'-bis(hydroxy)-6,6'-bibenzothiazole sodium salt was cooled to 90° C. and 30 grams of 1-diethylamino-2-chloro-ethane were added. The reaction mixture was heated to 130–133° C. for 4 hours with stirring and under reflux. The reaction mass was then permitted to cool to 100° C. and 150 cc. of water and 10 cc. of sodium hydroxide solution were added, the mixture stirred for one-half hour, and the chlorobenzene layer which contained the reaction product was separated from the aqueous layer in a separatory funnel. The chlorobenzene solution was then dried over sodium sulfate and filtered. To the filtrate, comprising 2,2'-bis(β-diethylaminoethylmercapto)-4,4'-bis(β-diethylaminoethoxy)-6,6'-bibenzothiazole, were added 50 cc. of a 30% methanol-hydrogen chloride solution, whereupon 2,2'-bis(β-diethylaminoethylmercapto)-4,4'-bis(β-diethylaminoethoxy)-6,6'-bibenzothiazole tetrahydrochloride precipitated as a cream-colored sandy powder. Recrystallized from methanol-ether, the tetrahydrochloride melted at 230° C., with decomposition. The compound is very soluble in water, methanol, and ethanol.

9 grams of the tetrahydrochloride were dissolved in 100 cc. of water. To the resulting solution were added in a separatory funnel 100 cc. of ether and 8 cc. of 40% sodium hydroxide solution. The ether solution of the base thus formed was concentrated. The concentrate was dissolved in alcohol and filtered. To the filtrate were added 4.5 grams of lactic acid in 10 cc. of alcohol. The alcohol was removed in vacuo. The 2,2'-bis(β-diethylaminoethylmercapto)-4,4'-bis(β-diethylaminoethoxy)-6,6'-bibenzothiazole lactate was then obtained as a syrupy oil which was very soluble in water.

Example 2

72 grams of 2,2'-bis(mercapto)-4,4'-bis(hydroxy)-6,6'-bibenzothiazole, 48 grams of sodium methylate, 900 cc. of chlorobenzene, and 120 cc. of methanol were heated together with agitation to 70° C. for one-half hour, then heated within 1 hour to 130–133° C. to allow the methanol to distill off completely. After cooling the reaction mass to 90° C., 500 cc. of a chlorobenzene solution containing 120 grams of 1-dimethylamino-2-chloro-ethane were added, and the reaction mass was heated to the boil under reflux and good agitation for 4 hours. After cooling to 30° C., 500 cc. of water and 25 cc. of 40% sodium hydroxide solution were added and the mixture heated to 70° C. for 1 hour. The chlorobenzene layer which contained the reaction product was separated from the aqueous layer in a separatory funnel. The chlorobenzene solution was dried over sodium sulfate and filtered. The filtrate comprising 2,2'-bis(β-dimethylaminoethylmercapto)-4,4'-bis(β-dimethylaminomethoxy)-6,6'-bibenzothiazole, was diluted with 1,000 cc. of acetone. To the resulting solution were added 115 cc. of a 35% methanol-hydrogen chloride solution. The 2,2'-bis(β-dimethylaminoethylmercapto)4,4'-bis(β-dimethylaminomethoxy)-6,6'-bibenzothiazole tetrahydrochloride precipitated in the form of cream-colored crystals. The compound was filtered off and washed with acetone. It was recrystallized from methanolacetone, M. P. 223° C. The tetrahydrochloride is very soluble in water, soluble in methanol, ethanol, and isopropanol.

Example 3

18 grams of 2,2'-bis(mercapto)-4,4'-bis(hydroxy)-6,6'-bibenzothiazole, 300 cc. of chlorobenzene, 12 grams of sodium methylate, and 35 cc. of methanol were heated with agitation to 70° C. for one-half hour and then heated within 1 hour to 130–133° C. to allow the methanol to distill off completely. After cooling to 95° C., 32 grams of 1-dimethylamino-2-chloro-propane were added and the reaction mixture was heated under reflux with agitation for 4 hours at 130–133° C. The reaction mass was then permitted to cool to 100° C., and 200 cc. of water and 5 cc. of a 40% sodium hydroxide solution were added. The mixture was stirred for 1 hour and the chlorobenzene layer which contained the reaction product was separated from the aqueous layer in a separatory funnel. The chlorobenzene layer was filtered and concentrated in vacuo. The residue, comprising 2,2'-bis(β-dimethylaminoisopropylmercapto)-4,4'-bis(β-dimethylaminoisopropoxy)-6,6'-bibenzothiazole, was dissolved in methanol and diluted with acetone. To the resulting solution were added 50 cc. of 25% methanol-hydrogen chloride solution. The 2,2'-bis(β-dimethylaminoisopropylmercapto)-4,4'-bis(β-dimethylaminoisopropoxy)-6,6'-bibenzothiazole tetrahydrochloride was obtained as a slightly cream-colored precipitate. It was recrystallized from ethanol-acetone, M. P. 238° C. The tetrahydrochloride was very soluble in water, and soluble in ethanol, methanol, and isopropanol.

I claim:
1. A process which comprises hydrolyzing 2,2'-bis(mercapto)-4,4'-bis(methoxy)-6,6'-bibenzothiazole to form 2,2'-bis(mercapto)-4,4'-bis(hydroxy)-6,6'-bibenzothiazole, and reacting the latter compound in the form of an alkali metal salt with a lower dialkylaminoalkyl halide to produce a 2,2'-bis(di-lower alkylaminoalkylmercapto)-4,4'-bis(β-di-lower alkylaminoalkoxy)-6,6'-bibenzothiazole.

2. A process which comprises reacting 2,2'-bis(mercapto)-4,4'-bis(hydroxy)-6,6'-bibenzothiazole in the form of an alkali metal salt with a lower dialkylaminoalkyl halide.

3. A process which comprises reacting 2,2'-bis(mercapto)-4,4'-bis(hydroxy)-6,6'-bibenzothiazole sodium salt with 1-diethylamino-2-chloro-ethane.

4. A process which comprises reacting 2,2'-bis(mercapto)-4,4'-bis(hydroxy)-6,6'-bibenzothiazole sodium salt with 1-dimethylamino-2-chloro-ethane.

5. A process which comprises reacting 2,2'-bis(mercapto)-4,4'-bis(hydroxy)-6,6'-bibenzothiazole sodium salt with 1-dimethylamino-2-chloro-propane.

6. A compound selected from the group consisting of 2,2'-bis(di-lower alkylaminoalkylmercapto)-4,4'-bis(β-di-lower alkylaminoalkoxy)-6,6'-bibenzothiazoles and the acid addition salts thereof.

7. 2,2'-bis($\beta$-diethylaminoethylmercapto)-4,4'-bis($\beta$-diethylaminoethoxy) 6,6'-bibenzothiazole.

8. 2,2'-bis($\beta$-diethylaminoethylmercapto)-4,4'-bis($\beta$ - diethylaminoethoxy) - 6,6' - bibenzothiazole tetrahydrochloride.

9. 2,2'-bis($\beta$-diethylaminoethylmercapto)-4,4'-bis($\beta$ - diethylaminoethoxy) - 6,6' - bibenzothiazole lactate.

10. 2,2'-bis($\beta$-dimethylaminomethylmercapto)-4,4'-($\beta$-dimethylaminoethoxy)-6,6'-bibenzothiazole.

11. 2,2'-bis($\beta$-dimethylaminoisopropylmercapto) - 4,4' - bis($\beta$ - dimethylaminoisopropoxy) - 6,6'-bibenzothiazole.

NORBERT STEIGER.

References Cited in the file of this patent

UNITED STATES PATENTS

| Number | Name | Date |
|---|---|---|
| 1,847,514 | Heiz | Mar. 1, 1932 |